United States Patent [19]
Rappoport

[11] Patent Number: 5,997,953
[45] Date of Patent: Dec. 7, 1999

[54] OLEIC ACID AS AN ADDITIVE FOR A PROTECTIVE COATING

[75] Inventor: Leonid Rappoport, Mountain View, Calif.

[73] Assignee: 3L & T, Inc., Mountain View, Calif.

[21] Appl. No.: 08/923,665

[22] Filed: Sep. 4, 1997

Related U.S. Application Data

[63] Continuation-in-part of application No. 08/754,216, Nov. 20, 1996, Pat. No. 5,766,687.
[51] Int. Cl.$^6$ ........................................................ B50D 3/02
[52] U.S. Cl. .......................... 427/386; 106/219; 106/243; 106/287.17; 106/287.32; 106/287.34; 106/427; 106/431; 106/482; 106/503
[58] Field of Search .............................. 427/386; 106/219, 106/243, 287.17, 287.32, 287.34, 427, 431, 482, 503

*Primary Examiner*—Bernard Pianalto
*Attorney, Agent, or Firm*—Lumen Intellectual Property Services

[57] ABSTRACT

In a protective coating formulation requiring the use of polyamine molecules, oleic acid is used as a very effective additive to remove any excess polyamines. The carboxyl groups of the oleic acid molecules react with the amine groups of the polyamines to form a harmless amide molecule. The oleic acid thus removes excess pollutants from the final coating. In addition, the oleic acid reduces the viscosity of the coating before curing, making it easier to apply to surfaces, and decreases the curing time necessary. However, the addition of oleic acid does not affect the beneficial characteristics of the coating in any way.

8 Claims, 3 Drawing Sheets

5,997,953

OLEIC ACID AS AN ADDITIVE FOR A PROTECTIVE COATING

RELATED APPLICATION DATA

This application is a continuation-in-part of U.S patent application No. 08/754,216, filed on Nov. 20, 1996, now U.S. Pat. No. 5,766,687.

This invention was supported in part by Navy contract N00014-93- C-2160. The Government has certain rights in the invention.

FIELD OF THE INVENTION

This invention relates generally to the creation of protective coatings for metals. More particularly, it relates to the use of oleic acid as an additive for protective coatings.

BACKGROUND OF THE INVENTION

There is a pervasive and continuing need for protecting metals from corrosive chemical action, such as in metal pipes, stacks, chimneys, bridges, chemical plant machinery, ship hulls, and containers for aggressive chemicals, to name just a few. In addition to having a high resistance to chemical action, an ideal coating has other properties, specifically: the raw materials required to produce the coating are commercially available, inexpensive, and non-hazardous, the coating has a low viscosity before curing, the hardening process of the coating is quick and does not release pollutants, and the final coating does not contain unnecessary substances.

The most widespread anticorrosive coatings possessing many of the above properties are polyurethanes and epoxide resins (see for example, *Coating Systems: A guidance Manual For Field Surveyors,* American Bureau of Shipping and Affiliated Companies, 1995). These coatings have good chemical resistance to many substances, have adhesion to metals that is satisfactory for many purposes, and have good mechanical properties. Neither polyurethanes nor epoxide resins, however, satisfy all the criteria for an ideal coating for metal.

As is known from rubber chemistry (*Encyclopedia of Polymer Science & Technology,* John Wiley & Sons, N.Y., vol 12, p.161, 1970), solid ebonite, commonly known as hard rubber, is a polymer material with sulfur content used for vulcanization. Ebonite, like elastomeric or flexible rubber, is made from a combination of sulfur with polydienes (unsaturated rubbers containing double bonds). Solid ebonite is a hard, non-flexible, plastic-like material possessed of unique chemical resistance to aggressive substances such as acids, alkalis, salt solutions, oil, and gasoline. In addition, solid ebonite has good mechanical properties. In spite of these advantages, however, solid rubbers have a high viscosity and can not be easily applied to metal surfaces, they release toxic fumes during vulcanization, and they require a long time to harden.

A liquid ebonite formulation for coating metals was developed by Ju. N. Pushkarev, V. I. Anosoff, and A. L. Labutin, and described in their article "A vulcanization and the properties of ebonite coatings made on the base of liquid CiS-1.4-polybutadiene", Caoutchouc and Rezina, N3, 1979 (Russian). The formulation is prepared by mixing the components as shown in Table 1.

TABLE 1

| Compound | Mass Parts |
| --- | --- |
| Liquid polydiene rubber with hydroxyls or without functional groups | 100 |
| Sulfur | 40 |
| diphenylguanidine (accelerator) | 3 |
| Zinc Oxide (activator) | 5 |
| Cab-O-Sil (thixotropy agent) | 5 |
| white spirit (thinner; used sometimes) | 5–10 |

The curing processes of liquid ebonite has presented problems in the past. During the process volatile and toxic products are released, including hydrogen sulfide. Moreover, the release of gases during curing produces microcavities which reduce the strength and protective properties of the coating.

OBJECTS AND ADVANTAGES OF THE INVENTION

It is a primary object of the present invention to provide an additive for a protective coating that reduces the amount of pollutants. It is another object of the present invention to provide an additive for a protective coating that removes excess polyamines. It is another object of the present invention to provide an additive that reduces the viscosity of a protective coating before curing. Yet another object of the present invention is to provide an additive that decreases the curing time for a protective coating. It is a further object of the present invention to leave the beneficial characteristics of a protective coating unchanged.

SUMMARY OF THE INVENTION

The present invention uses oleic acid as an additive for protective coatings made from polyamines. Oleic acid contains carboxyl groups which can react with the amine groups of excess polyamines to produce harmless amide molecules. As the reaction is irreversible under reaction conditions, the excess polyamines are removed from the final coating. In addition, the use of oleic acid reduces the viscosity of the coating before curing, making it easier to apply to surfaces. Oleic acid also decreases the time necessary for complete curing of the protective coating. In the preferred embodiment, 2 mass parts of oleic acid are used.

DETAILED DESCRIPTION

In a preferred embodiment of the present invention, liquid epoxidized rubbers containing the epoxies are used in forming a protective coating. The examples of epoxidized low molecular weight liquid rubbers include Ricopoxy polymers (Ricon) and Poly BD-600 or -605 (Elf Atochem North America), which are commonly called the oxiranes (see Wheelock, C. E., *Industrial Eng. Chem.* vol. 50, N3, p.299–304, 1958).

Amines are used to activate and dissolve sulfur in a vulcanization process. Examples of amine hardeners for epoxies are the various types of Unirez (Union Camp Chemical Co), 1,3-meta-xylene diamine (MXDA), 1,3-bis (aminomethyl) cyclohexane (Mitsubishi Gas Chemical Companies), and poly(oxypropylene) amines (Jeffamines, Huntsman Corporation). Since amines are good absorbents of acidic gases, such as hydrogen sulfide and sulfur oxides, the use of amines also reduces the amount of toxic fumes which may be released in the vulcanization process.

In the preferred embodiment, the coating formulation is produced by mixing the compounds listed in Table 2 in the relative amounts indicated. The formulation of the invention contains epoxidized liquid rubber, sulfur, an amine hardener, micronized aluminum oxide, butadiene-nitrile rubber, and oleic acid.

TABLE 2

| Compound | Description | Mass Parts |
| --- | --- | --- |
| epoxidized liquid rubber | coating building block | 100 |
| sulfur | vulcanizing agent | 30–35 |
| polyamine | hardener and solvent | 2–6 |
| micronized aluminum oxide | heat conducting agent | 5–10 |
| di-phenyl-guanidine | accelerator | 2–3 |
| zinc oxide | activator | 5–6 |
| cab-o-sil (silica fine dispersed) | thixotropy agent | 2–10 |
| butadiene-nitrile rubber (chemigum) | elastifier | 1–2 |
| calcium oxide | absorber | 3–5 |
| oleic acid | additive | 2–3 |

Figure 2:
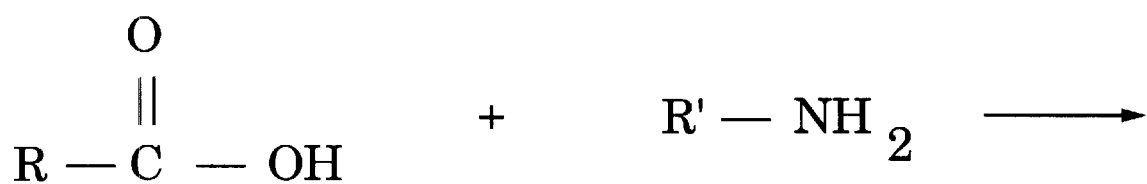
FIG. 2 is a diagram showing the reaction of oleic acid and a polyamine molecule.
Figure 2:
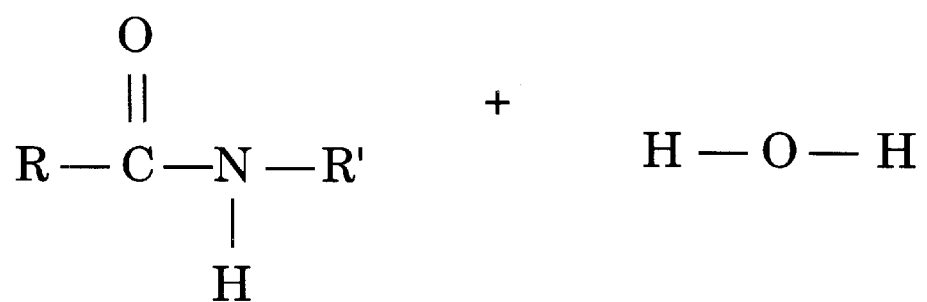
Figure 3:
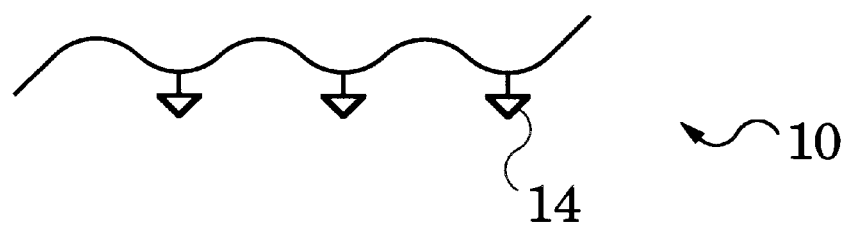
FIG. 3 is a diagram showing liquid rubber molecules with epoxy groups.
Figure 4:
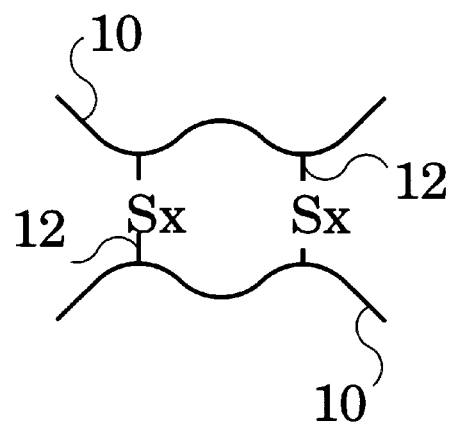
FIG. 4 is a diagram showing the reaction between liquid rubber molecules with epoxy groups and short activated sulfur chains to form cross-linked clusters of rubber molecules
Figure 5:
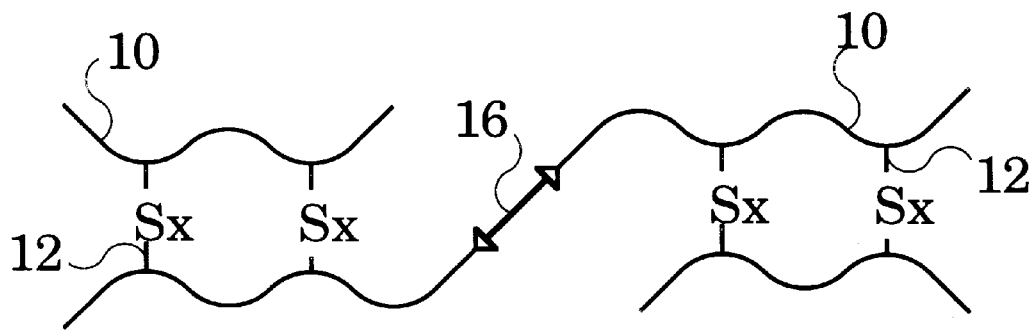
FIG. 5 is a diagram showing the rubber molecule clusters bonded together by amines to form a unified matrix

Liquid rubber molecules 10 with epoxy groups 14, as shown in FIG. 3, react with short activated sulfur chains 12 to form cross-linked clusters of rubber molecules, as shown in FIG. 4. FIG. 5 illustrates how these rubber molecule clusters are further bonded together by amines 16 to form a unified matrix. However, this reaction often results in excess polyamines that are left unreacted. These excess polyamines are a problem because they disrupt and weaken the final structure of the protective coating. The addition of oleic acid solves this problem. As shown in FIG. 2, the carboxyl groups of the oleic acid react with the amine groups of the polyamine, resulting in an amide molecule. As this reaction is irreversible under reaction conditions, the excess polyamines are removed from the final coating.

In a preferred embodiment, an effective method to mix all components is as follows. First, each powder-like component except sulfur is separately mixed with an amount of liquid rubber, creating a few master batches. In another master batch, the sulfur and the oleic acid are dissolved in the amine. Then these separate master batches are mixed together with the remaining amount of liquid rubber which has the remaining portion of sulfur dissolved in it. Obviously, this is one of many possible methods of mixing the components to produce the coating of the invention, and such methods will be evident to those skilled in the art upon reading the present description.

Figure 1:
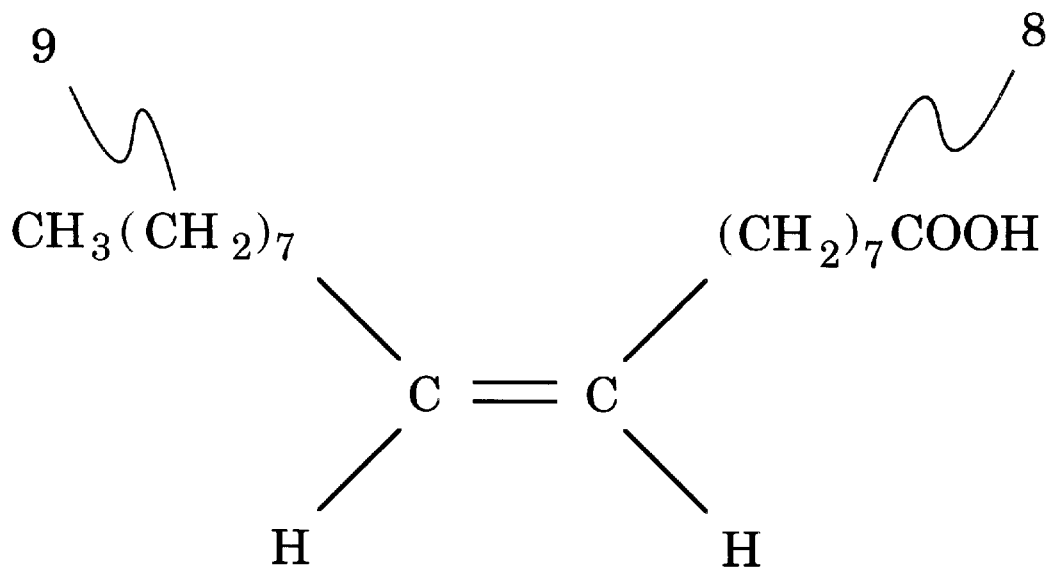
FIG. 1 is a diagram of oleic acid.

The addition of oleic acid reduces the viscosity of the protective coating before curing. The chemical structure of oleic acid is shown in FIG. 1. As can be seen, it has a polar head 8 and a non-polar tail 9. Thus, oleic acid is a surfactant and can mix with both polar and non-polar substances. This characteristic homogenizes the coating formation and reduces the viscosity. Thus it is easier to apply the coating to surfaces.

After all the components of the formulation are mixed, the resulting liquid is applied to a metal surface by any of many common techniques such as spreading, brushing, rolling or spraying.

After the liquid formulation has been applied to the metal, it is heated by any of many common techniques. For example, the coated metal may be convectionally heated, e.g. by baking in an oven, radiatively heated, e.g. by exposure to infrared radiation, or electrically heated, e.g. by passing electric current through it. Typically the coating changes its visible appearance upon hardening, indicating that the curing process is complete. The addition of oleic acid also reduces the curing time necessary. Oleic acid is part of the fatty organic acid group, whose members are known to be regular activators during sulfur vulcanization. The total curing time for the present formulation is between 10 min. and 60 min.

It will be clear to one skilled in the art that the above invention may be altered in many ways without departing from the scope of the invention. Accordingly, the scope of the invention should be determined by the following claims and their legal equivalents.

EXAMPLE 100 mass parts epoxidized liquid rubber PolyBD-600 (Elf Atochem North America) was mixed with 35 mass parts sulfur, 10 grams micronized aluminum oxide, 5 mass parts zinc oxide, 3 mass parts calcium oxide, and a pre-made mixture consisting of 3 mass parts di-phenyl-guanidine and 2 mass parts polyamine UniRez 2810 (Union Camp Chemical Co). After mixing for 30 minutes, 3 mass parts cab-o-sil was added.

The resulting formulation was then divided into two equal parts. One part was tested without any modifications. The second part received 2 mass parts oleic acid per 100 mass parts PolyBD-600. Both parts were cured at 1600 C for 30 minutes The following is a comparison of the properties of the two products.

| | Formulation | |
| --- | --- | --- |
| Properties | No Oleic Acid | Oleic Acid |
| Viscosity (before curing) 20° C., Brookfield, sp | 132,000 | 106,000 |
| Hardness (after curing) Shore D | 60 | 90 |
| Volatile Substances % weight | 2.5 | 0.6 |

What is claimed is:

1. A method for protecting a metal, the method comprising:

(a) forming a liquid mixture comprising epoxidized liquid rubber, amine, sulfur, and oleic acid;

(b) applying the mixture to the metal to form a coating; and (c) heating the coating until it hardens.

2. The method of claim 1 wherein the step of forming a liquid mixture comprises mixing a combination of the sulfur, the oleic acid, and the polyamine with a combination of the sulfur and the epoxidized liquid rubber.

3. The method of claim 1 wherein the heating step is completed in less than one hour.

4. The method of claim 1 wherein the liquid mixture further comprises a heat conducting agent.

5. The method of claim 4 wherein the heat conducting agent is selected from the group consisting of aluminum oxide and titanium oxide.

6. The method of claim 1 wherein the liquid mixture further comprises an accelerator.

7. The method of claim 6 wherein the accelerator is di-phenyl-guanidine.

8. The method of claim 1 wherein the liquid mixture further comprises butadiene-nitrile rubber.

* * * * *